UNITED STATES PATENT OFFICE.

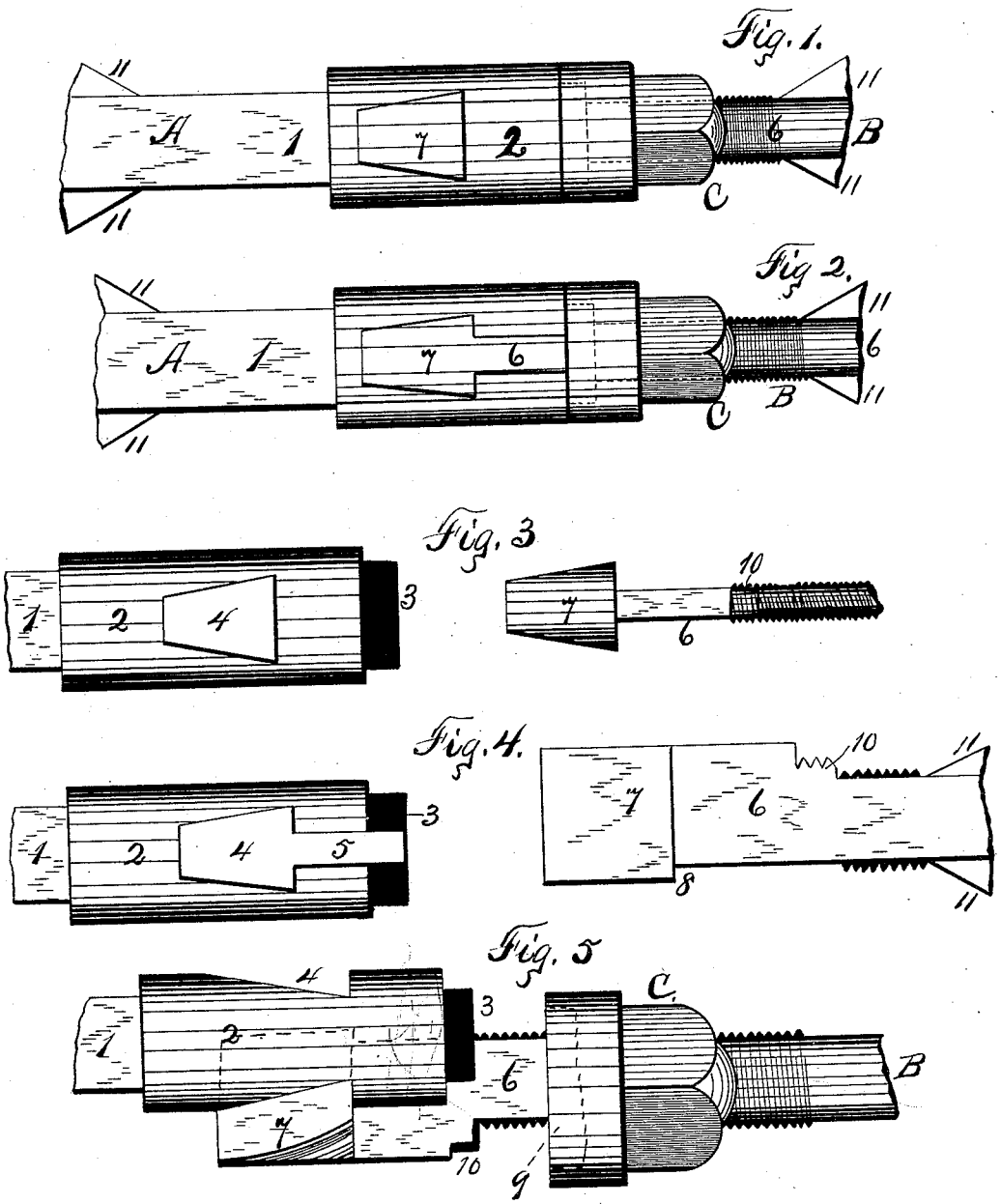

JAMES O. TEFFT, OF OLEAN, NEW YORK.

SUCKER-ROD.

SPECIFICATION forming part of Letters Patent No. 420,748, dated February 4, 1890.

Application filed November 19, 1889. Serial No. 330,877. (No model.)

*To all whom it may concern:*

Be it known that I, JAMES O. TEFFT, of Olean, in the county of Cattaraugus, in the State of New York, have invented new and useful Improvements in Sucker-Rods, of which the following, taken in connection with the accompanying drawings, is a full, clear, and exact description.

My invention relates to the joints used in connecting the sections of sucker-rods, and especially to those which depend upon a mortise-and-tenon joint between the sections, either alone or in conjunction with a keeper.

My object is to improve the utility and durability of the connection by producing a joint which will not slip loose or unscrew, thereby disconnecting the sections, but which can be easily separated when desired.

It consists in providing a male coupling-section consisting of a shank having a dovetailed tenon-head and a female section having a dovetailed mortise to receive the head, and a mortise opening into it to receive the shank of the male section, with a keeper to make an additional lock. It is constructed as follows, reference being had to the accompanying drawings, in which—

Figure 1 is a rear elevation of the joint complete with a keeper locking the joint. Fig. 2 is a front elevation of the same. Fig. 3 is a rear elevation of the male and female sections of the joint detached, the keeper being omitted. Fig. 4 is a front elevation of the female section and a side elevation of the male section detached. Fig. 5 is a side elevation of the coupling, showing the keeper screwed away from the joint and the male and female sections partly detached.

A B are the sucker-rods. The rod A is provided at one end with a shank 1, having a cylindrical body 2, which is provided with a stem 3 on its outer end, a mortise 4, the ends of which are shown as straight and parallel to each other, while the sides diverge substantially as shown. 5 is a slotway opening outward from the mortise through the stem 3. The rod B is provided with a threaded flat-sided shank 6, having upon its outer end a head 7, adapted to fit the mortise 4, while the shank fits into the slotway 5, the head having a shoulder 8.

C is the keeper, consisting of a tubular nut screwing on over the shank 6 and having a recess 9 (shown in dotted lines in Fig. 5) of proper size to fit onto the stem 3 and onto the shoulder 10 upon the shank 6, locking the coupling-sections together, as shown in Figs. 1 and 2.

To uncouple the rods, I unscrew the nut and then force the sections apart sidewise, drawing the head and shank out from the mortise and slotway until clear from each other.

To make the coupling, I slide the head and shank into the mortise and slotway and screw down the nut.

I do not limit myself to the precise form of heads shown, for there are many equivalents which will perform the same holding functions, and the one illustrated in the drawings is given as a sample.

At 11 I show the ordinary straps connecting the shanks to the body of the rod.

What I claim, and desire to secure by Letters Patent, is—

A rod-coupling consisting of a female section comprising a cylindrical body secured to the rod-shank, a threaded stem upon its outer end, a mortise through the body and a longitudinal slotway through the stem and body opening into the mortise, and a male section comprising a head fitting the mortise, and a shank to which the head is secured, and which is secured to the rod and fits the slotway, and a nut fitting over the shank and screwing into the end.

In witness whereof I have hereunto set my hand this 8th day of November, 1889.

JAMES O. TEFFT.

In presence of—
WM. V. SMITH,
H. P. DENISON.